United States Patent
Cushing et al.

[11] 3,736,065
[45] May 29, 1973

[54] RADIATION SENSITIVE MEANS FOR DETECTING OPTICAL FLAWS IN GLASS

[75] Inventors: Charles J. Cushing, Churchville; Kurt C. Schwind; Richard D. Vander Neut, both of Philadelphia, all of Pa.

[73] Assignee: Philco-Ford Corporation, Philadelphia, Pa.

[22] Filed: May 9, 1972

[21] Appl. No.: 251,833

[52] U.S. Cl..............................356/239, 250/219 DF
[51] Int. Cl............................................G01n 21/32
[58] Field of Search ...................250/219 DF; 350/6, 350/162 SF, 285; 356/120, 167, 200, 209, 210, 237

[56] References Cited
UNITED STATES PATENTS 3,245,306  4/1966  Potter et al...........................356/209
3,081,665  3/1966  Griss et al.............................356/120

Primary Examiner—William L. Sikes
Attorney—Robert D. Sanborn and Harry W. Hargis III

[57] ABSTRACT

Apparatus for detecting flaws in a continuously moving ribbon of float-formed glass, comprising optical elements constructed and arranged to direct scanning beams of light through the glass ribbon, and which, in combination with associated discriminating means, afford a system which detects discrepancies in the transmission of light in the region of a flaw contained in the glass. In addition to the optical elements, the disclosed apparatus comprises a flaw marking unit and a control unit. Information as to the exact nature and location of marked flaws in the inspected glass may be stored in a computer, in the order of severity of the flaw. The apparatus claimed is particularly adapted to detect ream and wave flaws.

10 Claims, 11 Drawing Figures

PATENTED MAY 29 1973 3,736,065
SHEET 1 OF 4
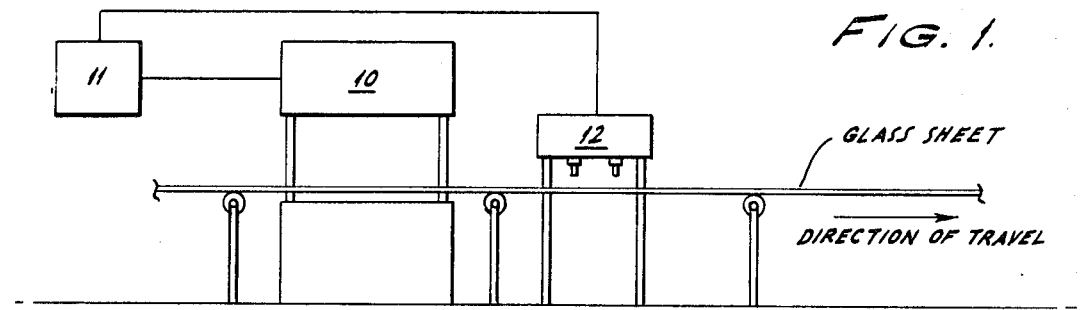
FIG. 1.
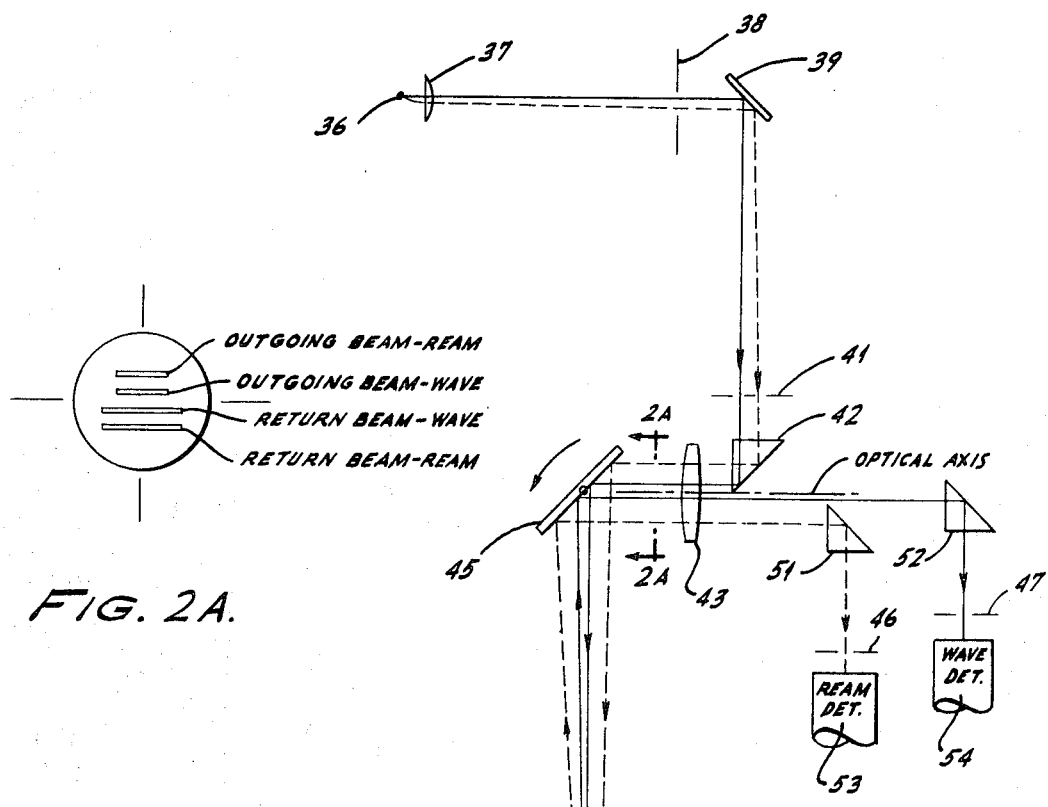
FIG. 2A.
FIG. 2.

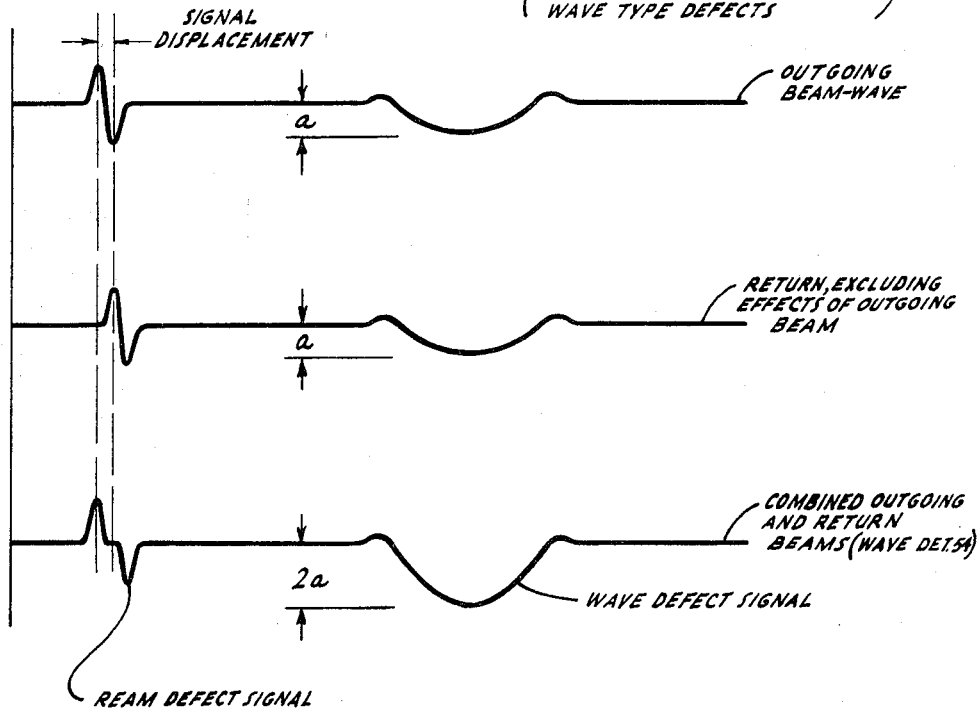
FIG. 7. (OUTPUT OF WAVE CHANNEL OPTICS SHOWING REINFORCEMENT OF WAVE TYPE DEFECTS)
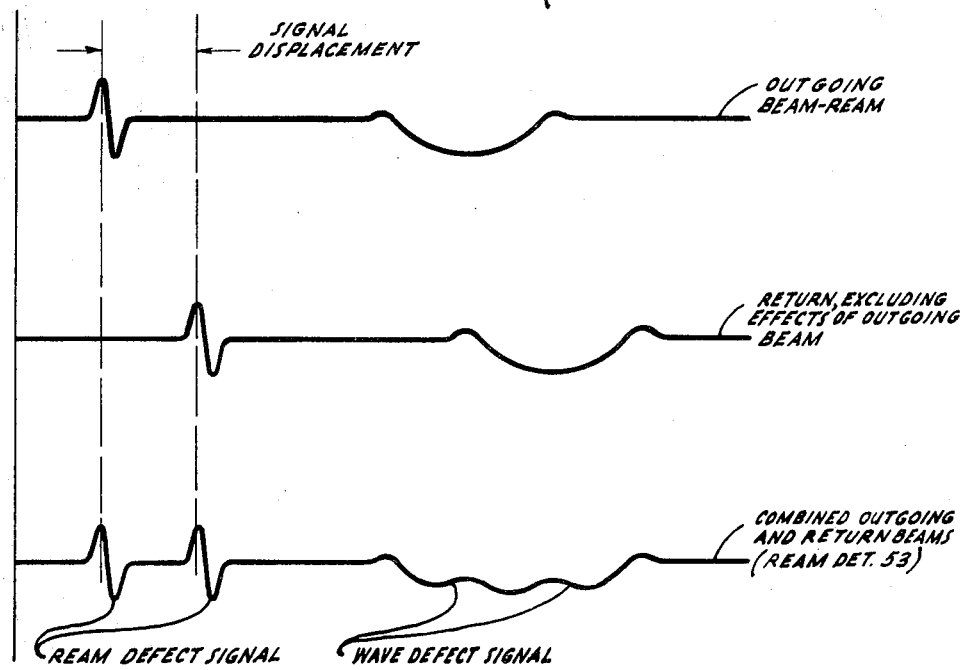
FIG. 8. (OUTPUT OF REAM CHANNEL OPTICS SHOWING FREQUENCY REDUCTION OF WAVE TYPE DEFECTS)

RADIATION SENSITIVE MEANS FOR DETECTING OPTICAL FLAWS IN GLASS

CROSS REFERENCE TO RELATED DISCLOSURE

The present application discloses and claims improvements in apparatus for detecting flaws in transparent material, which flaws are defined as Optical Flaws. Our copending disclosure, Ser. No. 251,832, filed May 9, 1972, and assigned to the assignee of the present invention, discloses, but does not claim, the apparatus comprising the present invention.

BACKGROUND OF THE INVENTION

This invention relates to apparatus for detecting flaws in transparent material, and more particularly to improved optical means and flaw-identifying means for use in such apparatus. While of broader applicability, the invention has particular utility in the inspection of sheet glass manufactured by the float process.

Prior art apparatus for inspecting glass and other transparent materials has been somewhat limited in capability for accurate detection, identification, and recording of information concerning flaws, and it is a general objective of the present invention to provide improved apparatus overcoming such limitations.

A flaw, or defect, in a sheet of glass is considered to be any abnormality within or on the surface of the glass sheet, which interferes with the normal transmission of light. Flaws fall into two general categories, known as "metal flaws", with which our copending case is particularly concerned, and "optical flaws". The present invention is directed to the detection of optical flaws, which are divided into subcategories comprising "wave" and "ream". A wave is an undulation occurring repetitively on the surface of a sheet of float glass, and which extends in a direction generally parallel to the direction of the glass flow. A ream is a narrow band within the glass which has an effective refractive index different from the surrounding material, and which also extends generally parallel to the direction of glass flow. Other conditions which present optical characteristics to the scanner that are similar to any of the above discussed types of flaws may be classified as one or more of those flaws.

It is an objective of this invention to provide improved glass inspection apparatus capable of both identifying and distinguishing between wave and ream flaws.

A further and more specific objective of the invention is in provision of improved optical scanning means, operable in combination with improved electrical circuitry, to achieve identification of wave and ream flaws.

SUMMARY OF THE INVENTION

In achievement of the foregoing as well as other objectives, the invention contemplates provision of means for continuously moving a ribbon of glass along its line of length, and improved optical means associated therewith operable continuously to scan the width of the ribbon, in detection of wave and ream flaws and like imperfections. A processing circuit means coupled with the optical means is effective, upon detection of a flaw of predetermined shape and size, to determine the location, type, and severity of the flaw, and to transmit this information instantly to suitable control circuit and marking means for identifying the flaw (i.e. wave or ream) on the glass.

The invention is particularly featured by provision of means for optically producing a pair of scanning beams, one for ream and the other for wave flaws, from a single source, and thereafter further optically displacing the beams as they are redirected through the inspected glass and returned to impinge on suitably disposed photodetectors. Such an arrangement enhances capability for distinguishing between ream and wave flaws.

The manner in which the foregoing and other objectives of the invention may best be achieved will be more fully understood from a consideration of the following description, taken in light of the accompanying drawing.

BRIEF DESCRIPTION OF THE DRAWING

FIG. 1 is a diagrammatic showing, in elevation, of the general organization of glass flaw detection apparatus embodying the invention;

FIG. 2 is a diagrammatic showing of the ream and wave detection optical system embodied in apparatus seen in FIG. 1;

FIG. 2A is a sectional showing of a light beam taken in the plane indicated by arrows 2A—2A applied to FIG. 2;

FIG. 7 is a diagrammatic illustration of the output of wave channel optics showing reinforcement of signals for wave type defects;

FIG. 8 is an illustration similar to FIG. 7, but showing the output of the ream channel optics showing frequency increase of signals for ream type defects;

DETAILED DESCRIPTION OF THE PREFERRED EMBODIMENT

Figure 3:
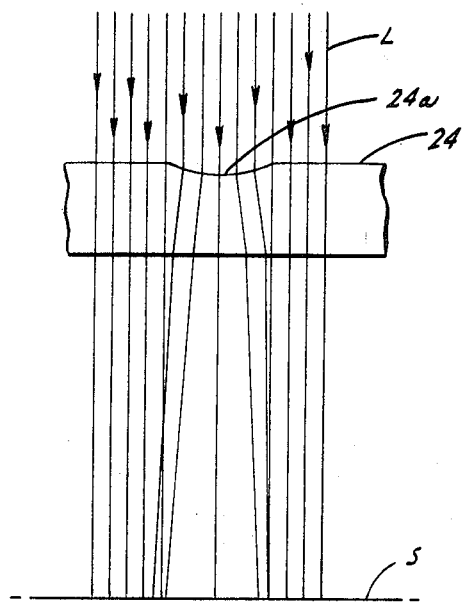
FIG. 3 is an enlarged sectional view of a wave defect in the glass, and showing the path of a light beam passing therethrough.

With more detailed reference to the drawing, and first to FIG. 1, apparatus embodying the invention includes an Optical Scanning Unit 10, a Control Console Unit 11, and a Gun Marking Unit 12. By way of example, the above apparatus may comprise one of four modules, each capable of scanning a section of glass 32 inches wide, so that with four such modules, a ribbon of glass 128 inches wide can be inspected continuously as it is moved along a predetermined path.

Each optical scanning unit 10 includes elements disposed above and below the glass undergoing inspection and comprises a Ream and Wave Flaw Subsystem contemplated by the present invention, and a Metal Flaw Subsystem to which our above identified copending application is directed.

Figure 4:
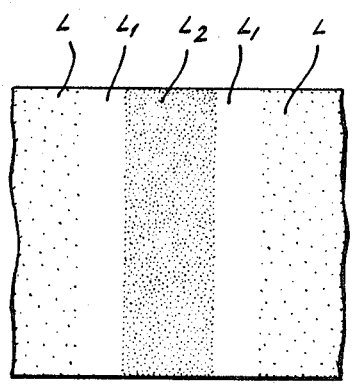
FIG. 4 is a showing of the light beam as it would appear in the plane indicated by the letter S applied to FIG. 3.

Prior to a detailed consideration of the Wave and Ream Subsystem as shown in FIGS. 2 and 2A, it will be helpful if reference is first made to FIGS. 3 and 4, directed to optical aspects of wave defect identification. Light normally incident on a sheet of glass 24, and passing therethrough will obey Snells Law. With a wave defect, there is a change in glass thickness featured by a corresponding radius of curvature as is seen at 24a, FIG. 3, and the paths of the individual light rays L will be altered at the transition points of the glass thickness changes. If the altered light rays are projected onto a screen S, the apparent cross section of the beam will contain alternating light and dark bars L-1 and L-2, respectively, as seen in FIG. 4.

Figure 5:
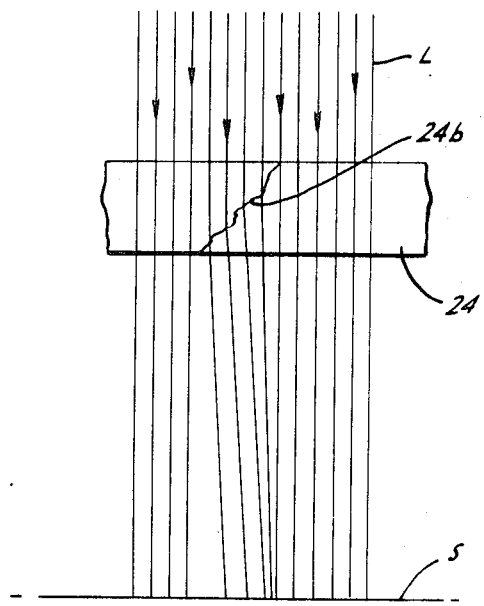
FIGS. 5 and 6 are views similar to FIGS. 3 and 4, respectively, but illustrating the path of a beam of light passing through a ream defect.
Figure 6:
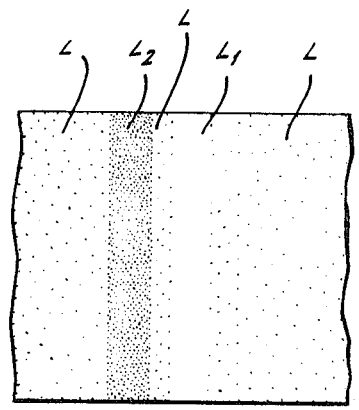

Similarly, and with reference to FIGS. 5 and 6, ream defects 24b will change the index of refraction of the glass 24 so that the paths of the light rays L will be altered as seen in FIG. 5. The apparent cross section of the beam, as viewed on screen S according to the illustration in FIG. 6, will include corresponding light and dark bars L-1, L-2, respectively, but of lesser width than the bars seen in FIG. 4.

The Ream and Wave Flaw Subsystem is operable to detect optical flaw defects of the type described above, which defects are oriented generally parallel to the direction of glass flow, extending for distances as much as several feet. With more detailed reference to FIG. 2, light emanating from a source 36, such as a quartz-iodide lamp, is directed through a condensing lens 37, and the resultant beam of light is passed through a light stop aperture 38 to be reflected by a mirror 39. The beam reflected by mirror 39 is interrupted by double-slit aperture 41 to form two narrow beams of light. These two narrow beams are then reflected by prism 42 to pass through lens 43 for reflection by a single-facet rotating mirror 45 through glass 24, onto cylindrical mirror 44. Rotating mirror 45 is located at the center of curvature of cylindrical mirror 44, the axis of such curvature being generally parallel to the glass and extending in the direction of glass flow.

The two outgoing beams are located to one side of the optical axis with respect to rotating mirror 45, so that the return beams as reflected by the mirror 44 fall to the opposite side of the optical axis of lens 43 (see FIG. 2A), and are directed onto slotted apertures 46 and 47, via a pair of prisms 51 and 52, respectively, for impingement on respective ream and wave flaw detectors 53 and 54.

The important difference between the ream and wave channels are the locations of the beams as they strike glass 24. In especial accordance with the invention, the wave channel beam (solid line) is close to the center line of the optical system, so that both the outgoing and return beams will pass through a defect at substantially the same instant, thus reinforcing the relatively low frequency wave defect signal, as will be appreciated from a consideration of FIG. 7. The ream channel beam (broken line) is farther from the optical axis, as is seen in FIG. 2, so that either the outgoing beam or the return beam will pass through a defect at a given instant. Thus a pair of distinct high frequency signals are generated by each ream defect, as will be appreciated from FIG. 8.

Figure 9:
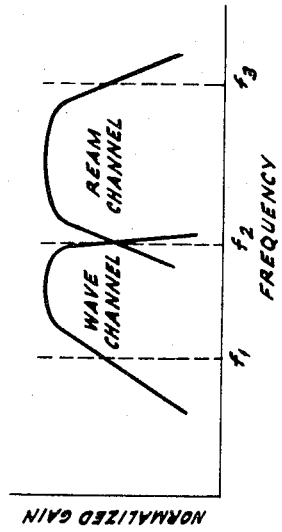
FIG. 9 is a diagrammatic showing of the ream and wave signal frequency ranges.

The frequency of a defect signal has been shown to be related to the identity of the defect, so that the wave and ream signals will fall within specific frequency ranges. If scanned by identical optical systems there would be an overlap in the ream and wave signal frequencies. As will be appreciated from FIG. 9, the apparatus contemplated by the present invention advantageously affords the ability to optically increase the frequency separation between the wave and ream signals, so that a distinct separation in frequency ranges is obtained. With two specific but different frequency ranges obtained from the defects, a bandpass filtering technique is used for defect discrimination.

Figure 10:
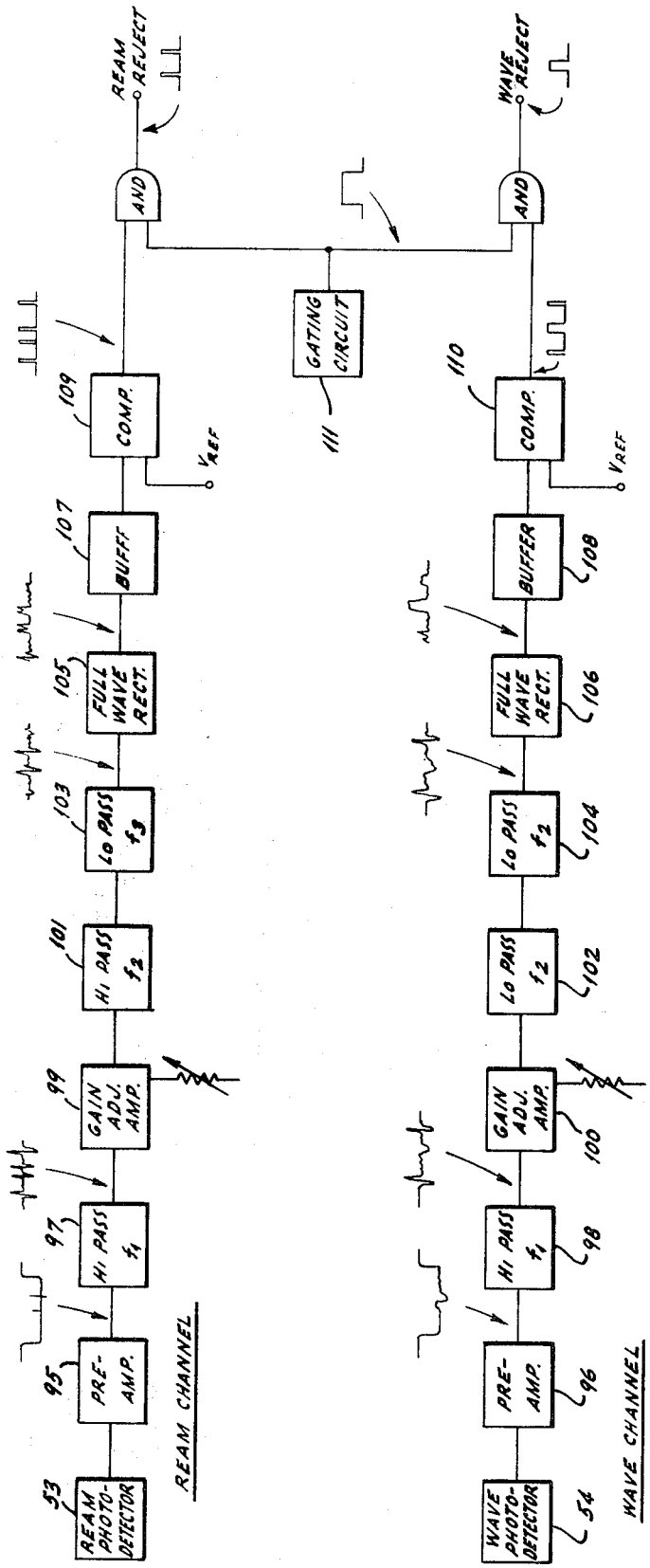
FIG. 10 is a schematic showing of a ream and wave signal processing circuit.

FIG. 10 illustrates circuitry employed to discriminate between the wave and ream defects. Light energy is converted to electrical energy in the photodetectors 53 and 54. Preamplifier gain stages 95 and 96 are used to obtain good signal-to-noise ratio, and the signals then are applied, respectively, to a pair of high pass amplifiers 97 and 98, which are used to eliminate the D.C. levels of the scan signals. This is followed by a pair of channel gain adjustment amplifiers 99 and 100. Bandpass amplifiers 101 to 104 are then used to pass desired frequencies. Full wave rectifiers 105 and 106 are used to provide single polarity outputs from either polarity input, and buffers 107 and 108 are used for impedance matching. The signals are then applied to comparator circuits 109 and 110. Thresholding is obtained from fixed reference voltage levels (V ref), and the outputs are then in digital form.

Logic type gating 111 is employed to monitor a specific portion of the total scan signal, thereby to eliminate any false indications from the ringing signal at the beginning and end of scan signals.

The optical system of the present invention is essentially that of a basic SCHLIEREN system modified to enhance the differentiation between ream and wave defects. In the basic system, a mask is disposed on the optical axis, whereas according to the present invention, a pair of masks of the slit-type are provided as seen at 41 in FIG. 2, one used in the detection of ream defects and the other in the detection of wave defects. The wave defect slit is closer to the optical axis but not directly on it, whereas the ream defect slit is further from the optical axis. In effect, there are two SCHLIEREN systems, one for detecting wave defects and the other for detecting ream defects.

The optical path travelled by the light is folded by cylindrical mirror 44 such that each defect will be detected twice by each scanning beam of light. Each photodetector 53, 54 will therefore generate two pairs of signals, one pair displaced from the other according to the offset of the corresponding slit from the optical axis of the system.

Since the wave defect beam path is close to the optical axis, the pair of signals generated in wave photodetector 54 by a wave defect, as it is traversed by the outgoing and return wave beams, will be only slightly displaced timewise (right-hand portions of curves, FIG. 7), whereas the pair of signals generated in the ream photodetector 53 by a ream defect will be greatly displaced timewise (left-hand portions of curves, FIG. 8).

Since wave defects are generally wider than ream defects, a wave defect will generate a wider "signal" (right-hand portions of curves, FIG. 7) than a ream defect will (left-hand portions of curves, FIG. 8). When two such wide wave defect signals are superimposed (i.e. outgoing and return, FIG. 7), their amplitudes a, will be additive, as seen at 2a. When two narrow ream pulses, as detected by the wave detector, are superimposed their outputs may partially cancel, as seen in the left-hand portion of the lower curve in FIG. 7.

Two wave defect pulses, as detected by the ream detector (right-hand curves, FIG. 8), are greatly separated. Due to this separation, there is no increase in amplitude, the result being that they produce a single signal of greater width (also right-hand lower curve, FIG. 8). When two narrow pulses having a great displacement are added, as generated by a ream defect (left-hand portions of curves, FIG. 8), there are produced two ream defect signals instead of a single signal. These phenomena have the effect of: increasing the amplitude of the wave defect signals in the wave channel, while partially cancelling the ream defect signals in the wave channel; and producing a higher frequency ream defect signal in the ream channel by doubling the high frequency pulses, without increasing the amplitude of the low frequency pulses.

Automatic marking means 12 may be of a number of known types, one of which is disclosed in U.S. Pat. No. 3,445,672, dated May 20, 1969, and assigned to the assignee of the present invention. A preferred marking system is disclosed in the copending application of Charles J. Cushing and Kurt C. Schwind, Ser. No. 257,845, filed May 30, 1972, and assigned to the assignee of the present invention. Briefly, the latter system comprises a set of primary marking guns, a set of backup marking guns, a glass scanner for monitoring marking by the primary marking guns, and means for activating a backup marking gun in the event a primary gun has failed to mark on command.

We claim:

1. In apparatus for detecting wave and ream defects, and like imperfections, in a sheet of glass as it is moved along a predetermined path, optical means having an optical axis and operable continuously to scan said sheet of glass, comprising: means for optically producing a pair of spaced, outgoing scanning beams from a single source, one for the detection of ream defects and the other for th detection of wave defects; means for optically displacing said spaced scanning beams to direct the latter to one side of the optical axis of said optical means; means for directing said displaced beams through said sheet of glass; means for reflecting said displaced beams for return through said sheet of glass and to the other side of the optical axis of said optical means; means for causing each of said displaced return beams to impinge on suitably disposed photodetectors individual to the beams; and processing circuit means associated with said photodetectors and effective to detect, and distinguish between, disruptions in said light beams as caused by such ream and wave defects.

2. Apparatus according to claim 1, and further characterized in that said means for optically producing said outgoing scanning means comprises a source of light; stop means positioned for impingement by said light and including a pair of spaced, generally parallel slit apertures disposed to one side of the optical axis of said system to form a pair of spaced beams; and a scanning mirror rotatable about a pivot on said optical axis and positioned to receive said pair of spaced beams in a region thereof disposed to one side of said pivot, said mirror upon rotation transforming said pair of spaced beams into said spaced, outgoing scanning beams.

3. Apparatus according to claim 1, and further characterized in that said means for optically producing said spaced scanning beams comprises: means for forming a collimated beam of light; light stop means disposed in said beam of light and including a pair of spaced, generally parallel slits for forming a pair of spaced beams; focusing lens means aligned with said optical axis and interposed in the path of said spaced beams in such position that said beams pass through said lens means to one side of said optical axis; and scanning mirror means positioned to receive light from said focusing lens means, and being mounted for rotation about an axis located on said optical axis; said mirror means and said lens means being further positioned to focus said outgoing beams on said sheet of glass; and said mirror further being positioned for impingement by said return beams to the other side of said optical axis followed by reflection of said return beams through said focusing lens means onto said photodetectors.

4. Apparatus according to claim 1, and characterized in that said means for producing said scanning beams is effective to displace one of said outgoing beams further from said optical axis than the other of the outgoing beams.

5. Apparatus according to claim 4 and further characterized in that the path traversed by said one outgoing beam is such that it is reflected back through said glass in a region substantially spaced from its region of its initial passage through the glass, thereby being effective in the detection of ream flaws, and the path traversed by the other of said outgoing beams is such that it is reflected through substantially the same region of glass as it is caused to pass initially, thereby being effective in the detection of wave flaws.

6. Apparatus according to claim 5 and further characterized in that scanning is effected by a planar, rotational mirror having its center of rotation on the optical axis of the optical means.

7. Optical means having an optical axis and operable continuously to scan a sheet of glass, in the detection of ream and wave defects, and like imperfections, in such a sheet of glass as it is moved along a predetermined path, comprising: means for producing a pair of spaced, outgoing scanning beams, one beam for the detection of ream defects and the other beam for the detection of wave defects; means for optically displacing said spaced scanning beams to one side of the optical axis of said optical means; means for directing said displaced beams through said sheet of glass; means for reflecting said displaced beams for return through said sheet of glass and to the other side of the optical axis of said optical means, said one scanning beam and its reflected counterpart being transmitted through said glass at substantially spaced regions of the latter, said other scanning beam and its reflected counterpart being transmitted through said glass in substantially the same regions of the latter; and means for causing each of said displaced return beams to impinge on suitably disposed photodetectors individual to the reflected beams.

8. The combination as set forth in claim 7, and further including processing circuit means associated with said photodetectors and effective to detect, and distinguish between, disruptions in said light beams as caused by such ream and wave defects.

9. The combination as set forth in claim 7, and characterized in that said means for producing said scanning beams is effective to displace one of said outgoing scanning beams further from said optical axis than the other of the outgoing beams.

10. The combination as set forth in claim 7, and characterized in that the recited regions of impingement of said one beam and its reflected counterpart are spaced a distance greater than the widths of either a typical ream or wave defect.

* * * * *